United States Patent [19]
Tamaru et al.

[11] Patent Number: 5,414,413
[45] Date of Patent: May 9, 1995

[54] TOUCH PANEL APPARATUS

[75] Inventors: Hideshi Tamaru; Kazuo Togawa, both of Kanagawa; Akio Sakano, Ibaraki; Kimiyoshi Yoshida, Kanagawa, all of Japan

[73] Assignee: Sony Corporation, Tokyo, Japan

[21] Appl. No.: 362,020

[22] Filed: Jun. 6, 1989

[30] Foreign Application Priority Data

Jun. 14, 1988 [JP] Japan ................ 63-146210

[51] Int. Cl.6 .................................. G09G 1/16
[52] U.S. Cl. ........................... 345/175; 345/173
[58] Field of Search .......... 340/712, 718, 709; 341/31; 250/221; 178/18; 345/173, 174, 175

[56] References Cited

U.S. PATENT DOCUMENTS

| | | | |
|---|---|---|---|
| 4,198,623 | 4/1980 | Misek et al. | 340/712 |
| 4,672,364 | 6/1987 | Lucas | 340/712 |
| 4,703,316 | 10/1987 | Sherbeck | 340/712 |
| 4,761,637 | 8/1988 | Lucas et al. | 341/31 |
| 4,799,044 | 1/1989 | Masters et al. | 340/712 |
| 4,812,642 | 3/1989 | Hasegawa et al. | 340/712 |
| 4,855,590 | 8/1989 | Bures et al. | 340/712 |
| 4,933,544 | 6/1990 | Tamaru | 340/712 |
| 4,980,547 | 12/1990 | Griffin | 340/712 |

FOREIGN PATENT DOCUMENTS

0239705A1 10/1987 European Pat. Off. .
WO86/00446 1/1986 WIPO .

*Primary Examiner*—Richard Hjerpe
*Assistant Examiner*—Steven J. Saras
*Attorney, Agent, or Firm*—Limbach & Limbach; Philip M. Shaw, Jr.

[57] ABSTRACT

A touch panel apparatus of the type in which a plurality of photo-detecting pairs generate a plurality of detecting beams which cross the display surface and including a circuit for reducing the sensitivity of the photo-detecting pairs at the corners of the display surface to prevent malfunction due to reflected beams caused by the relatively higher intensity beams at those locations resulting from the relatively shorter beam lengths 8 Claims, 12 Drawing Sheets FIG. 2
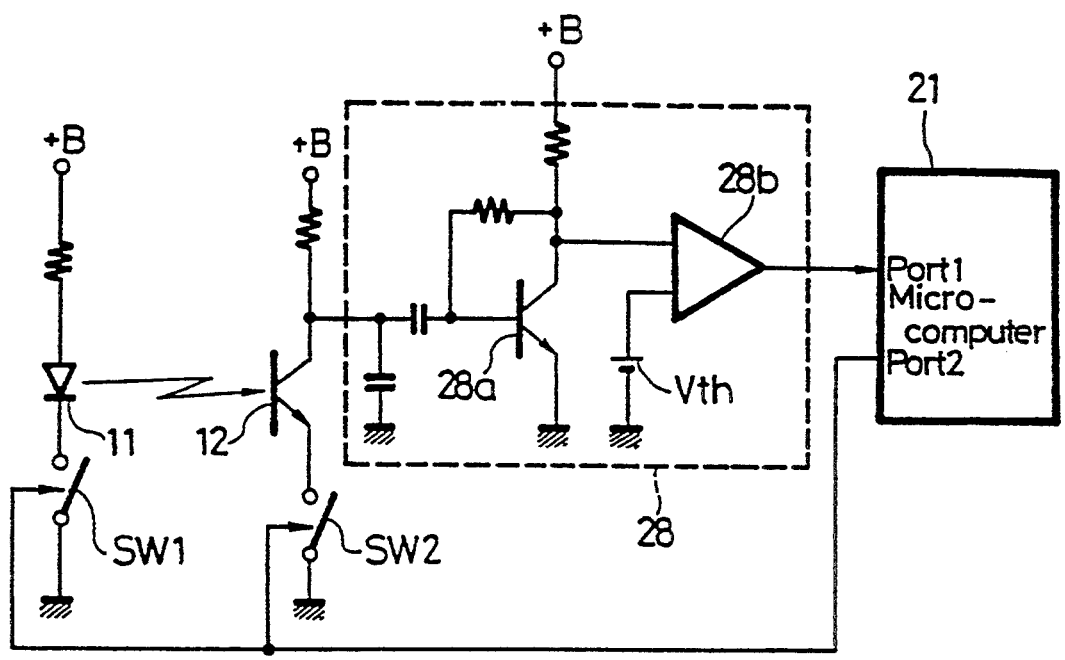
FIG. 3A
OUTPUT OF PHOTO-TRANSISTOR 12
(LONG BEAM)
FIG. 3B
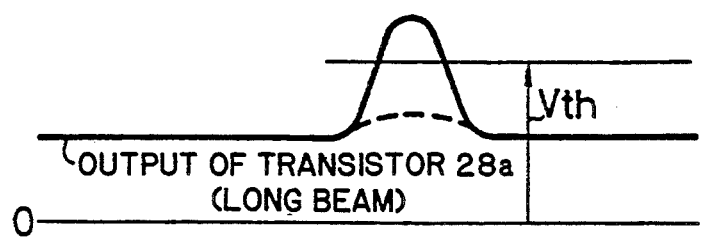
OUTPUT OF TRANSISTOR 28a
(LONG BEAM)
FIG. 3C
OUTPUT OF COMPARATOR 28b
(LONG BEAM)

FIG. 4A OUTPUT OF PHOTO-TRANSISTOR 12 (CORNER BEAM)

FIG. 4B OUTPUT OF TRANSISTOR 28a (CORNER BEAM)  Vth

FIG. 4C OUTPUT OF COMPARATOR 28b (CORNER BEAM)

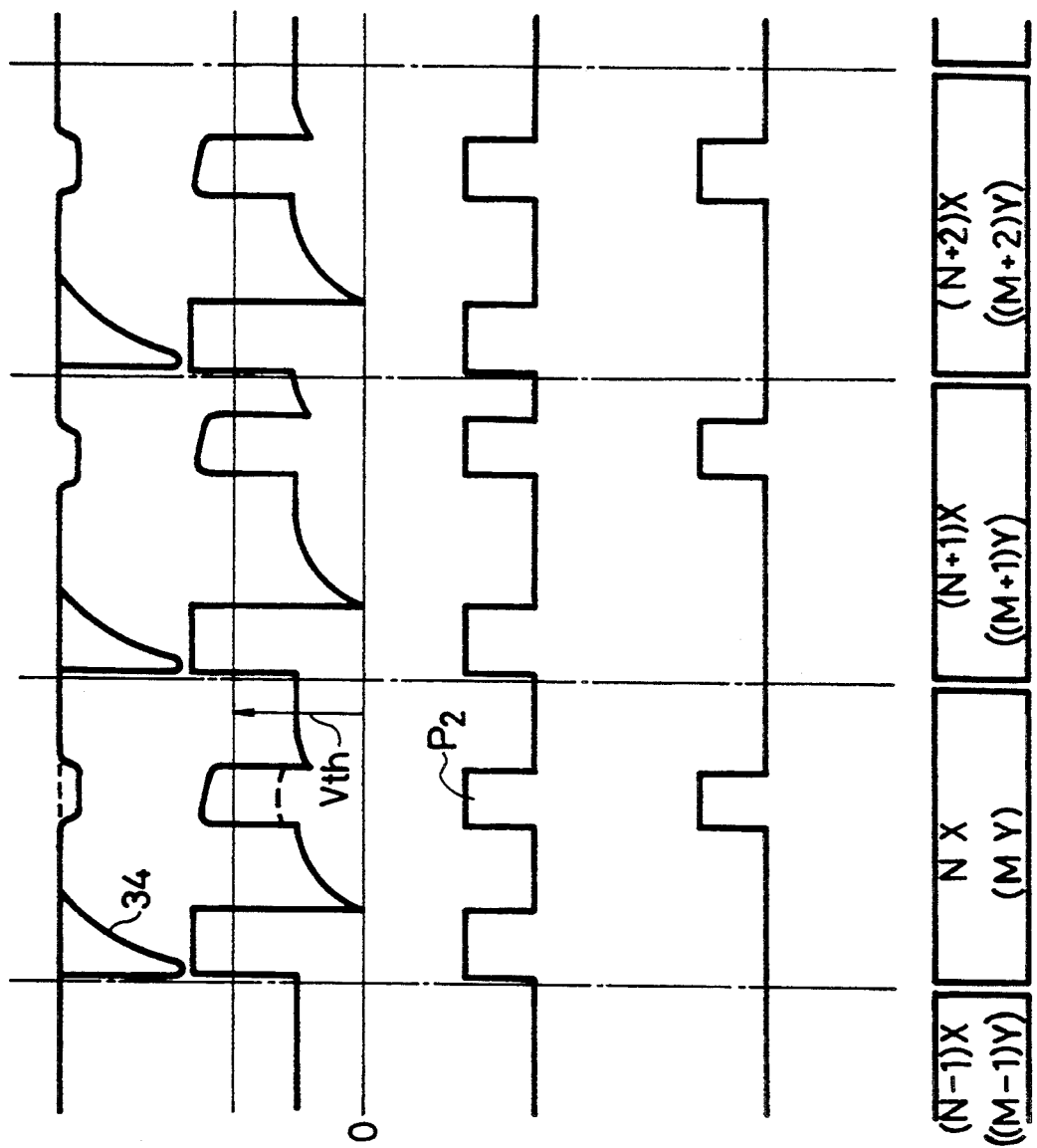

TOUCH PANEL APPARATUS

FIELD OF THE INVENTION

This invention relates generally to a touch panel apparatus and, more particularly, it is directed to a touch panel apparatus suitable for use with on-line bank systems, education systems, medical administration systems, office automation systems, factory automation systems such as a production process administration system or, home automation systems such as a security system or a communication system.

DESCRIPTION OF THE PRIOR ART

Various types of touch panel apparatus have been proposed in which data can be input by touching a display screen with a finger, instead of by touching a keyboard. An "optical-type touch panel" apparatus is an example of one such apparatus.

A touch panel system employing a plurality of light beams is well-known and described in U.S. Pat. Nos. 3,764,813, 3,775,560, etc. Such a touch panel system generally consists of a coordinate detection device and a display device, and forms a man-machine interface for any kind of computer system.

In some prior art, optical-type (i.e, infra-red light beam sensing) touch panel apparatus, for example, a plurality of light emitting diodes are located on the periphery of the bottom and the right sides of a display screen and they are energized to emit infra-red light beams. A plurality of photo-transistors, arranged on the opposite sides (i.e., on the top and the left sides of the display screen), receive the emitted infra-red light beams, and form a lattice of infra-red light beams. In other words, the infra-red light beams are orthogonally aligned relative to the rectangular image display screen.

It can be known which of the LEDs emits the light beam and which of the photo-transistors on the opposite side detects the light beam by sequentially specifying the address to change the respective LEDs and the photo-transistors coupled therewith to form the pairs. A touch on the display screen with a finger or a pen causes interruption of a certain infra-red light beam. The X and Y coordinates at a location where the light beam is interrupted are transferred to a host computer to determine the touched position.

The desired position is determined by the first interrupted infra-red light beam. If the infra-red light beams, which determine the touch position in the vertical direction (V direction), are sequentially emitted and received from the top, (i.e., the scanning is carried out from the top to the bottom), the infra-red light beam is interrupted by the top end of a forefinger extended from the bottom of the image display screen. The infra-red light beams, which are used to determine the position in the horizontal direction (H direction), are interrupted by a thumb or a middle finger, depending on whether the beam is scanned from the left or right of the forefinger (the positional relation is reversed in the case of the left hand), and the hand which points out the coordinates on the touch panels causes the wrong coordinates to be determined.

Therefore, in order to remove the above-mentioned defect, a touch panel apparatus, proposed in Japanese Patent Application No. 63-019383, corresponding to U.S. Pat. No. 4,933,544, and Japanese Patent Applications Nos. 63-53186 and 63-291934, corresponding to U.S. Pat. No. 4,888,479, and having the same assignee therewith, has light receiving elements and corresponding light emitting elements which are arranged on a square video display screen. A first beam group (R beam) is formed by infra-red light beams emitted and received from the lower left of the square video display screen to its upper right by the light emitting and receiving elements. A second beam group (L beam) is formed by infra-red light beams emitted and received from the lower right of the display screen to its upper left by the light emitting and receiving elements.

According to this touch panel apparatus, the first beam group (R beam) is scanned horizontally, from the left to the right (or from the right to the left), and the coordinate values are determined based on the position where the beam is first (or last) interrupted. The second beam group (L beam) is scanned horizontally from the right to the left (or from the left to the right) and the coordinate values are determined based on the position where the beam is first (or last) interrupted. Then, the overall plane coordinate values are obtained based upon the L beam and R beam coordinate values.

When the infra-red light beams are obliquely arranged on the square video display screen, as disclosed in Japanese Patent Application No. 63-53186, the length of some of the infra-red light beams (beam lengths) are much shorter than the others, particularly in the corner portion of the display screen. Therefore, the light emission intensity received by the light receiving elements at the corner portions of the display screen is much greater than at the other light receiving elements, resulting in an undesirable number of reflected light beams. If the operator interrupts the beam near the corner of the screen with his finger, the reflected light makes it difficult to detect the interrupt in the infra-red beam thus causing the touch panel apparatus to malfunction.

The above-noted defects will be described with reference to FIGS. 1 to 4. A touch panel apparatus according to the present invention consists of a cathode ray tube (CRT) (not shown) having a screen s and a coordinate detecting device 2, as shown in FIG. 1. The display surface s has a cylindrical form and has a curvature only in the lateral direction and has no curvature in the vertical direction. Printed circuit boards, though not shown, are located along the four sides of the display surface s.

On the printed circuit boards 13 on the bottom side and both of the lateral sides there are aligned a plurality of light emitting elements, for example, light emitting diodes 11 along the curved plane of the CRT, while on the printed circuit boards on the top side and both lateral sides there are aligned a plurality of light receiving elements, for example, photo-transistors 12 arranged opposite to the light emitting diodes 11 to establish corresponding photo coupling relationships therebetween and form a grid of oblique infra-red light beams on the rectangular video display screen, s.

If an infra-red light beam is interrupted at the corner of the display screen, s, by a light colored or reflective finger, or a finger covered by a white or light colored glove, as shown in FIG. 1, the infra-red light beam emitted from the light emitting diode 11 and having a somewhat diverging angle, will be reflected as shown by a broken line a or b. It is reflected onto an infra-red beam filter 14 located about the periphery of the display screen, s, and is thereby made incident on the photo-transistor 12.

The element pairs 11, 12 located in the corner portion of the display screen s have a short beam length. Hence, in the corner, the infra-red beam emitted from the light-emitting diode 11 is received by the photo-transistor 12 when the light beam is not diverging. However, the reflected, diverging light beam turns the photo-transistor 12 ON. The current provided by the photo-transistor 12 is amplified by a buffer circuit (not shown) having a sufficiently large amplification factor. The amplified signal is generated as an output as if the infra-red beams were not interrupted, (i.e. a malfunction occurs).

Referring to FIG. 2, a block diagram of a circuit is illustrated. This circuit operates in the apparatus where the beam length is long, i.e. except in the corner portion, as illustrated in FIGS. 3A to 3C.

Specifically, as shown in FIG. 2, when the infra-red light beam is not interrupted by the user's finger and then the switches SW1 and SW2 are turned ON, a light emitting diode 11 and a photo-transistor 12 pair is turned ON. Thus, the infra-red light beam from the light emitting diode 11 is received by the photo-transistor 12, and the photo-transistor 12 generates, at its output side, an output shown by a solid line in FIG. 3A. This output is amplified by a transistor 28a in a buffer circuit 28, and the transistor 28a generates, at its output side, an output shown by a solid line in FIG. 3B. This output is supplied to one input side of a comparator 28b where it is compared with a threshold voltage, Vth, supplied to the other input side of the comparator 28b. Since the transistor 28a output is larger than the threshold voltage, Vth, the comparator 28b generates a pulse signal shown as a solid line in FIG. 3C. This pulse signal is fed to port 1 of a microcomputer 21.

In this state, if the infra-red light beam from the light emitting diode 11 is interrupted by a finger, the output from the photo-transistor 12 decreases in comparison to the output when the infra-red light beam is not interrupted, as shown by a dashed line in FIG. 3A. Accordingly, the output of the transistor 28a is less than the threshold voltage, Vth, as shown by a dashed line in FIG. 3B, and the comparator 28b does not generate a pulse signal as shown by a dashed line in FIG. 3C. Since a pulse signal is not generated, the microcomputer 21 detects predetermined coordinates corresponding to the position of the finger.

As set out above, when the infra-red light beam is interrupted by a finger when the beam length is long, i.e. except in the corner portion of the display screen, the apparatus operates satisfactorily.

The above-mentioned apparatus, however, operates in the regions such as the corner portion, where the beam length is short as shown in FIGS. 4A to 4C. Specifically, as shown in FIG. 2, when the infra-red light beam is not interrupted by the finger or the like and the switches SW1 and SW2 are turned ON, the pair formed of the light emitting diode 11 and the photo-transistor 12 is turned ON. The infra-red light beam from the light emitting diode 11 is received by the photo-transistor 12 and the photo-transistor 12 generates, at its output side, an output shown by a solid line in FIG. 4A. This output is amplified by the transistor 28a in the buffer circuit 28, and the transistor 28a generates at its output side an output shown by a solid line in FIG. 4B. This output is supplied to one input side of the comparator 28b, in which it is compared with the threshold voltage, Vth, supplied to the other input side. This output of the transistor 28a is larger than the threshold voltage Vth so that the comparator 28b generates, at its output side, a pulse signal shown by a solid line in FIG. 4C. This pulse signal is fed to port 1 of the microcomputer 21.

In this state, if the infra-red light beam from the light emitting diode 11 is interrupted by a finger or the like, then although the original infra-red light beam is interrupted at the corner portion of the display screen, the reflected light generated from the infra-red light beam filter 14 or the like allows the photo-transistor 12 to generate, at its output side, an output shown by a dashed line in FIG. 4A as described above. This output is amplified by the transistor 28a and the comparator 28b generates at its output side an output that is larger than the threshold voltage Vth as shown by a dashed line in FIG. 4B. Consequently, the comparator 28b generates, at its output side, a pulse signal shown by a dashed line in FIG. 4C and this pulse signal is fed to the microcomputer 21, causing the microcomputer 21 to malfunction, i.e. to designate erroneous coordinates based on the reflected beam.

As a result, even though the original infra-red light beam is interrupted in portions, such as the corner portion, where the length of beam is short, an undesired, reflected light beam having a relatively high intensity level exists therein which is received by the receiving element, causing the apparatus to malfunction.

SUMMARY OF THE INVENTION

Accordingly, it is an object of the present invention to provide an improved touch panel apparatus which eliminates the defects encountered with the previous touch panel apparatus when the touched position is in the corner of the screen.

It is another object of the present invention to provide a touch panel apparatus which can prevent malfunctions from occurring due to reflected light beams.

The above and other objects are obtained by the present invention of a touch panel apparatus comprising a display panel having a relatively flat surface, a plurality of photo-detecting pairs adjacent to the display surface for generating a plurality of detecting light beams of different lengths passing across the display surface, means for reducing the sensitivity of the photo-detecting pairs having relatively shorter beam lengths, and a process circuit, connected to the plurality of photo-detecting pairs, for detecting the interrupted beams.

Another aspect of the present invention is to provide a touch panel apparatus comprising a display having a curved display surface; a first set of photo-detecting pairs adjacent to the curved display surface for generating a plurality of first parallel light beams having different lengths and which pass across the curved display surface, a second set of photo-detecting pairs provided adjacent to the curved display surface for generating a plurality of second parallel light beams having different lengths and passing across the curved display surface, wherein the first and second light beams are skewed relative to the direction of curvature of the cylindrical display surface; means for reducing the sensitivity of the photo-detecting pairs having a relatively shorter beam length; and a process circuit connected to the first and second sets of photo-detecting pairs for determining corresponding coordinates by detecting interrupted light beams.

These and further objects, features and advantages of the present invention will become apparent from the following detailed description of illustrative embodiments which is to be read in conjunction with the accompanying drawings, in which like numerals identify like elements and parts.

BRIEF DESCRIPTION OF THE DRAWINGS

FIG. 2 is a schematic circuit diagram showing one portion of the touch panel apparatus depicted in FIG. 1;

FIGS. 3A to 3C and FIGS. 4A to 4C are, respectively, schematic views used to explain the operation of the apparatus shown in FIG. 2;

FIGS. 13A to 13E are diagrams which are used to explain the operation of the circuit shown in FIG. 12A and 12B.

DETAILED DESCRIPTION OF PREFERRED EMBODIMENTS

The present invention will be described in detail with reference to FIGS. 5 to 10.

Figure 1:
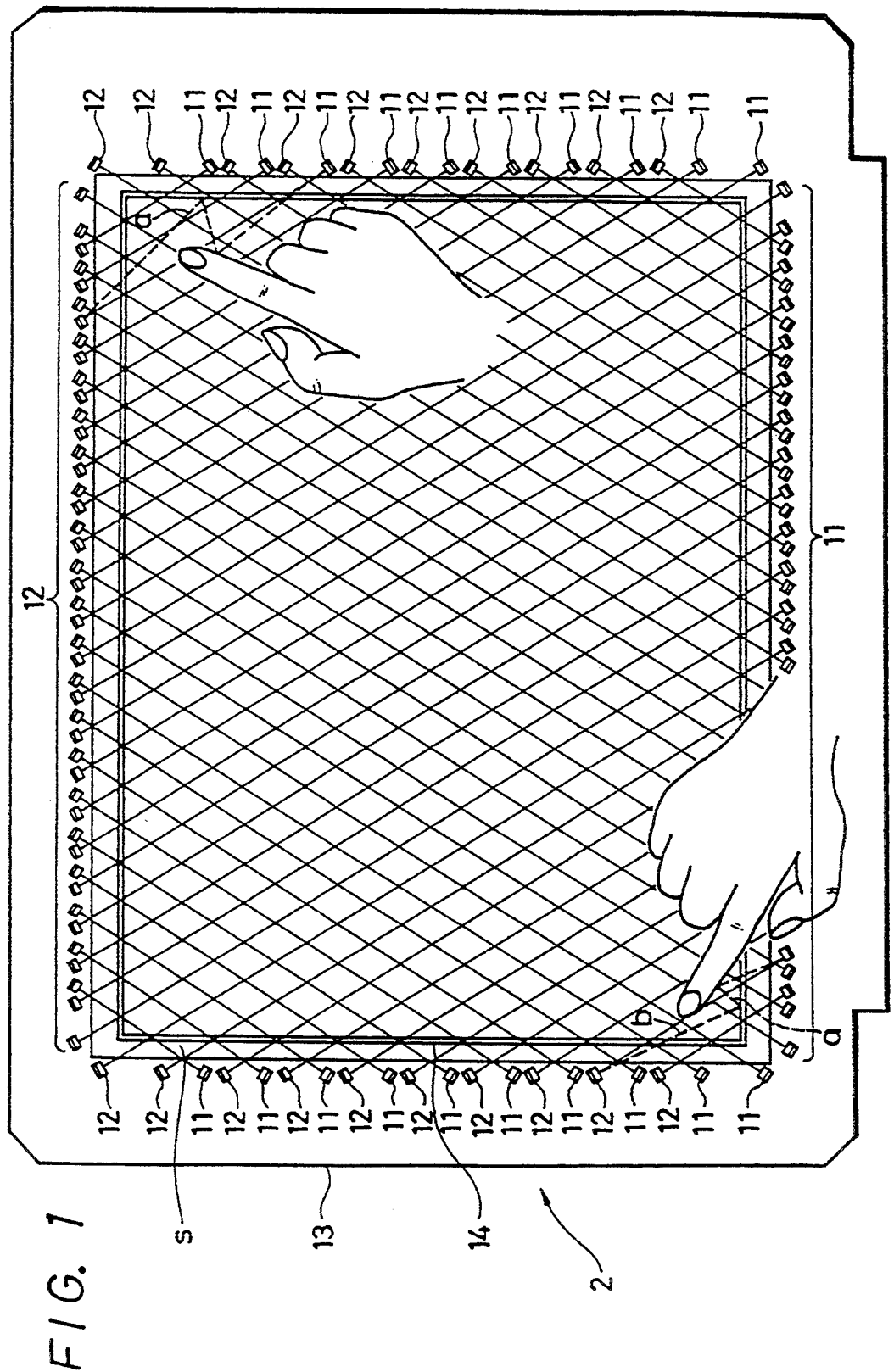
FIG. 1 is a pictorial representation of a proposed touch panel video display screen apparatus, illustrating the arrangement of light emitting elements and light receiving elements.
Figure 5A:
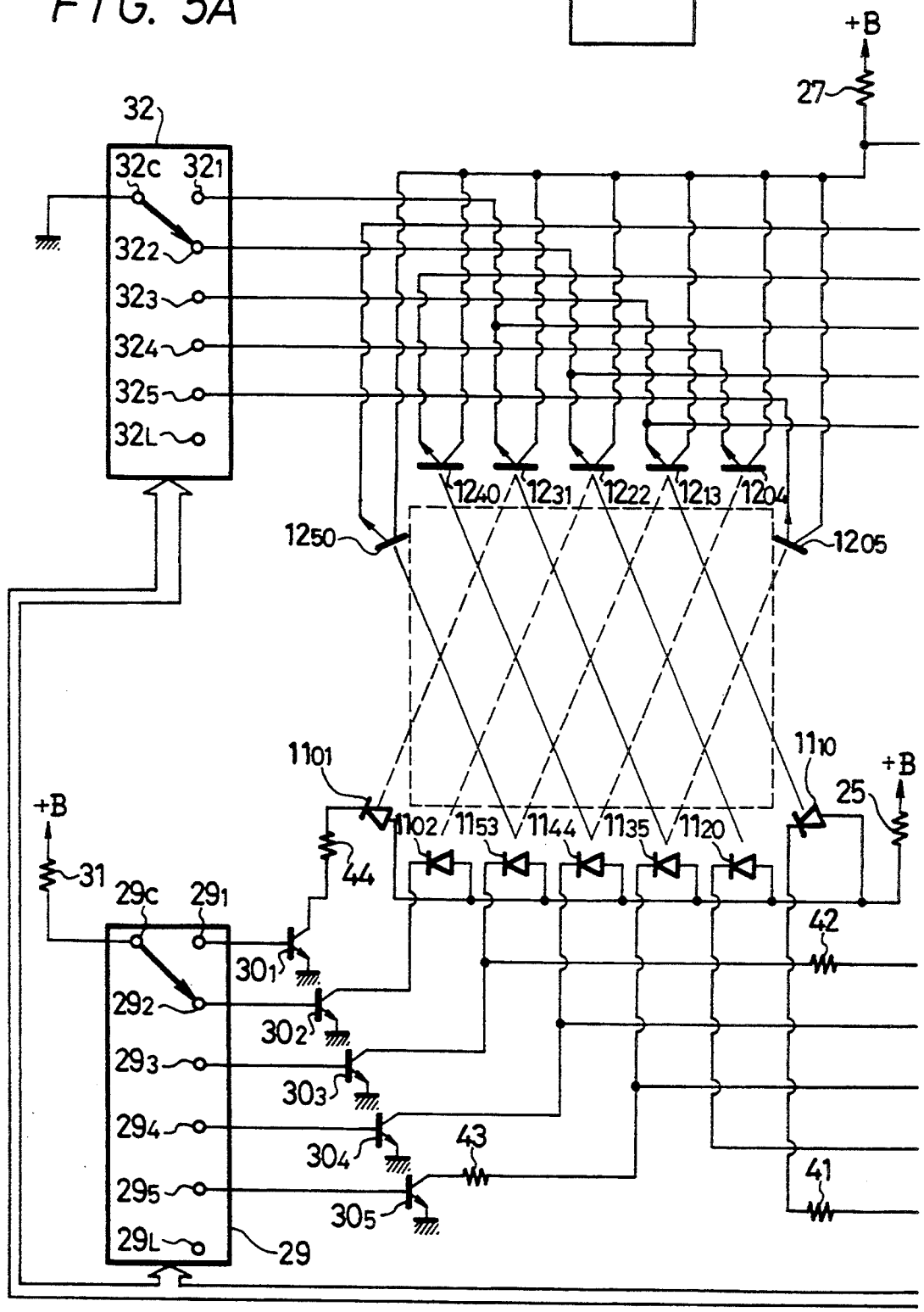
FIGS. 5A and 5B form a block diagram illustrating the circuitry in one embodiment of a touch panel apparatus according to the present invention.
Figure 5B:
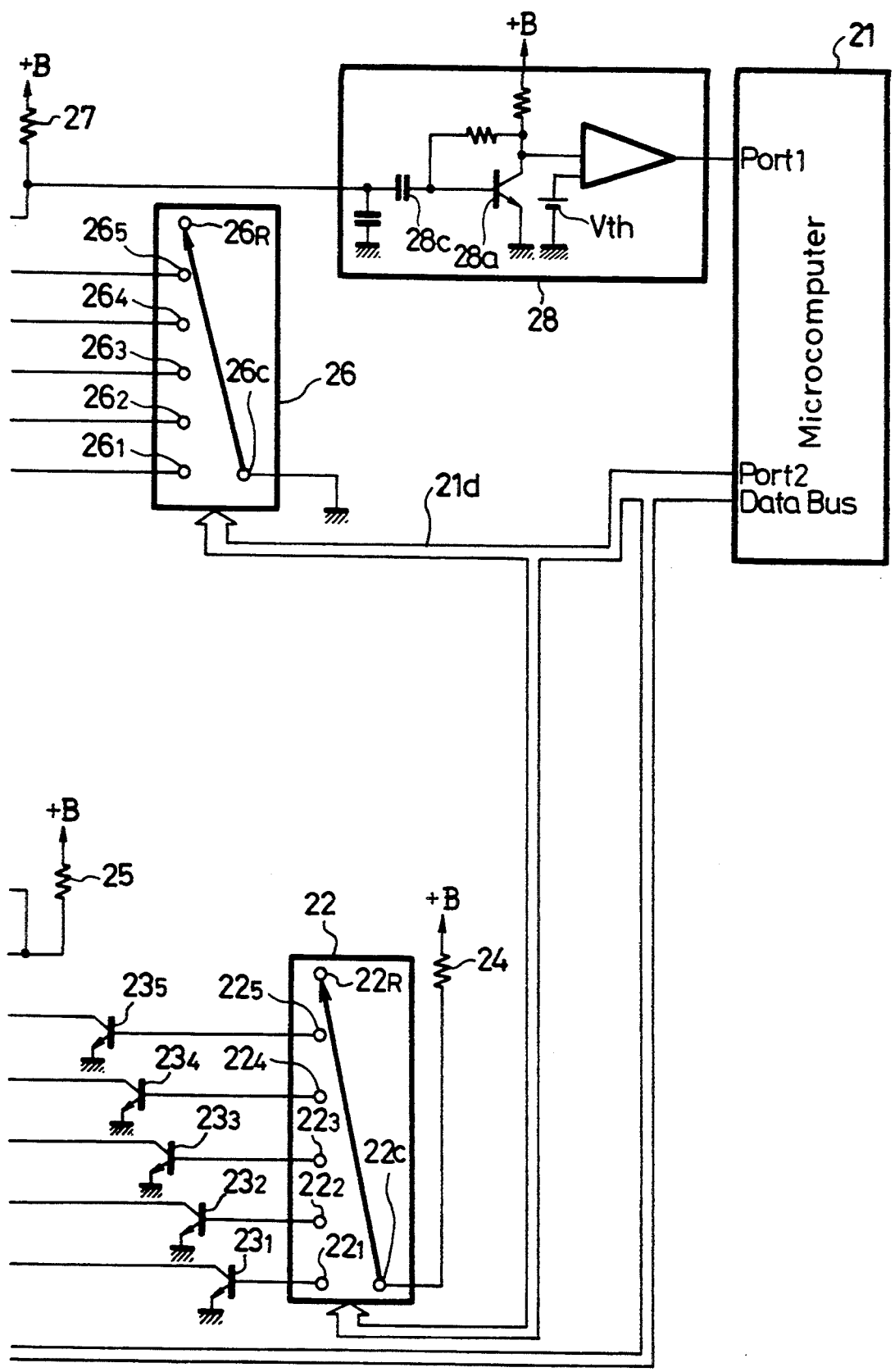

FIGS. 5A and 5B together illustrate a circuit arrangement for a touch panel apparatus according to the present invention. The light emitting diodes 11 and the photo-transistors 12 are aligned so that the photo-coupling relationship therebetween is oblique relative to the display screen of the cathode ray tube having a cylindrical curvature as described in connection with FIG. 1.

Figure 8A:
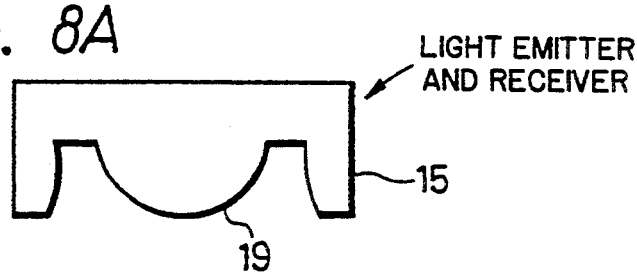
FIGS. 8A, 8B, and 8C are, respectively, a plan view, a front view, and a side view illustrating arrangements of a light emitting element and a light receiving element according to the present invention.
Figure 8B:
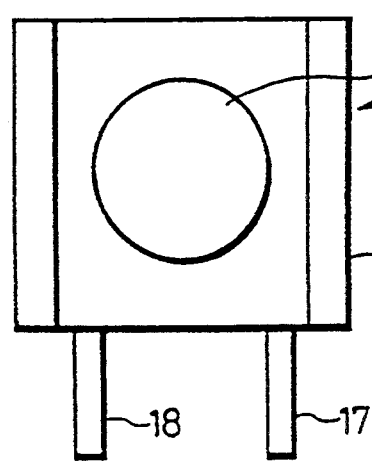
Figure 8C:
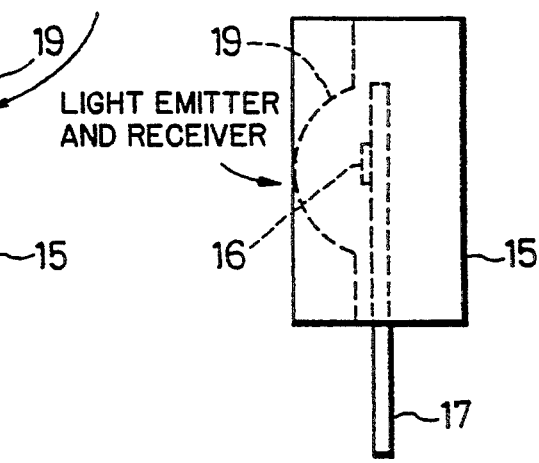

The structures and characteristics of the light emitting diode 11, provided as a light emitting element, and the photo-transistor 12, provided as a light receiving element, are illustrated in FIGS. 8A to 10. Each of FIGS. 8A to 8C illustrates the structure of the light emitting diode 11 and the photo-transistor 12, wherein FIG. 8A is a plan view thereof, FIG. 8B is a front view thereof, and FIG. 8C is a side view thereof. Throughout FIGS. 8A to 8C, reference numeral 15 designates a casing, 16 a pellet, 17 an anode or collector electrode terminal, and 18 a cathode or emitter electrode terminal. In the present embodiment, a lens 19, which serves as a converging device, is attached to the front wall of the casing 15 to be unitary so that if the element is used as the light emitting element, the lens 19 presents the maximum radiation sensitivity. If the element is used as the light receiving element, the lens 19 presents the maximum sensitivity for the infra-red light beam from the light emitting diode 11.

Figure 9:
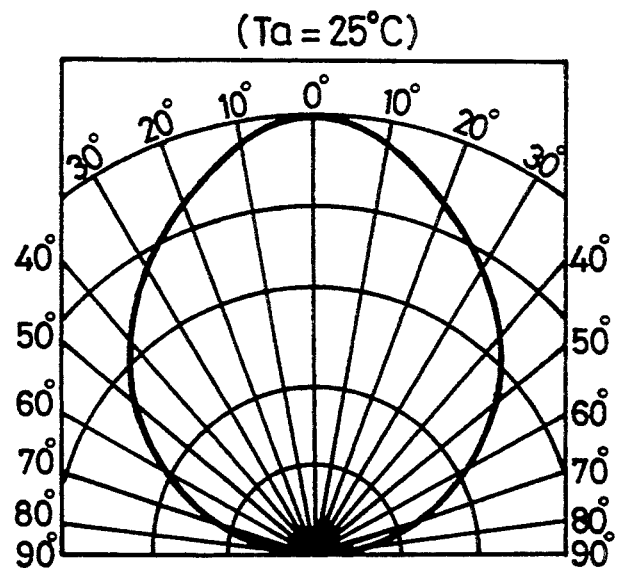
FIG. 9 is a schematic diagram showing a directional pattern of the light emitting element.
Figure 10:
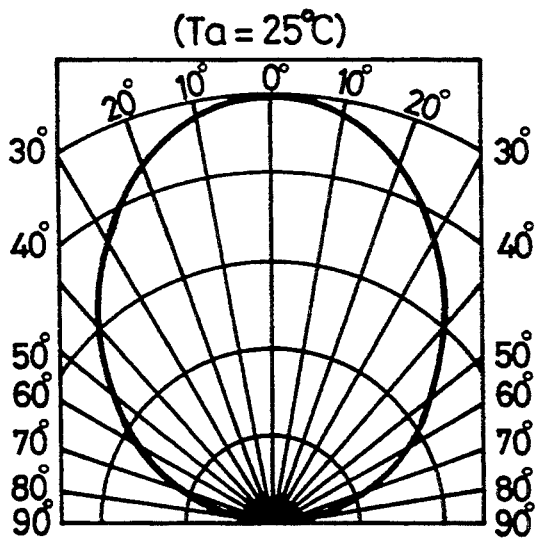
FIG. 10 is a schematic diagram showing a directional pattern of the light receiving element.

Since the lens 19 is mounted to the front wall of the casing 15, the light emitting diode 11 has a directivity characteristic as shown in FIG. 9, whereas the photo-transistor 12 has a directivity characteristic shown in FIG. 10 relative to the infra-red light beam from the light emitting diode 11. Therefore, it is apparent from FIGS. 9 and 10 that the light emitting diode 11 and the photo-transistor 12 have the maximum sensitivities as described above. Referring to FIGS. 9 and 10, the limit on the maximum opening angle is such that the sensitivity becomes one half.

Referring again to FIGS. 5A and 5B, a microcomputer 21 is connected to a selector 22, which is used to sequentially select, i.e. scan the light emitting diodes 11 that relate to the generation of the L beams in response to the address control signals from the microcomputer 21. The fixed terminals $22_1$ to $22_5$ of the selector 22 are respectively connected through switching transistors $23_1$ to $23_5$ to the cathodes of the light emitting diodes $11_{10}$, $11_{20}$, $11_{35}$, $11_{44}$ and $11_{53}$. The movable terminal $22c$ is connected through a resistor 24 to a positive voltage source $+B$. The selector 22 has an open fixed terminal $22_R$. The anodes of the light emitting diodes $11_{10}$, $11_{20}$, $11_{35}$, $11_{44}$ and $11_{53}$ are commonly connected and then connected to the positive voltage source $+B$ through a resistor 25.

A selector switch or scanner 26 responds to an address control signal from the microcomputer 21 to select, i.e. scan the photo-transistors 12 that are provided in relation to the L beams. In this case, the address control signal from the microcomputer is the same as the address data to be supplied to the selector 22. The fixed terminals $26_1$ to $26_5$ of the selector 26 are respectively connected to the emitters of photo-transistors $12_{13}$, $12_{22}$, $12_{31}$, $12_{40}$ and $12_{50}$, whereas the movable terminal $26c$ thereof is grounded. The selector 26 has an open fixed terminal $26_R$. The collectors of the photo-transistors $12_{13}$, $12_{22}$, $12_{31}$, $12_{40}$ and $12_{50}$ are commonly connected and they are then connected to the positive power supply terminal $+B$ through a resistor 27 as well as to port 1 of the microcomputer 21 through a buffer circuit 28.

A selector switch or scanner 29 responds to the address control signal from the microcomputer 21 to select, i.e. scan the light emitting diodes 11 that are provided in relation to the generation of the R beams. The fixed terminals $29_1$ to $29_5$ of the selector 29 are connected to the cathodes of the light emitting diodes $11_{01}$, $11_{02}$, $11_{53}$, $11_{44}$ and $11_{35}$ through switching transistors $30_1$ to $30_5$, respectively, while the movable terminal $29c$ thereof is connected to the positive power supply terminal $+B$ through a resistor 31. The selector 29 has an open fixed terminal $29_L$. The anodes of the light emitting diodes $11_{01}$ and $11_{02}$ are commonly connected, similar to the other light emitting diodes, and are then connected to the positive power supply terminal $+B$ through the resistor 25.

A selector switch or scanner 32 responds to the address control signal from the microcomputer 21 to select the photo-transistors 12 that are provided in relation to the R beams. In this case, the address control signal from the microcomputer 21 is the same as the address data to be supplied to the selector 29. The fixed terminals $32_1$ to $32_5$ of the selector 32 are respectively connected to the emitters of the photo-transistors $12_{31}$, $12_{22}$, $12_{13}$, $12_{04}$ and $12_{05}$, while the movable terminal $32c$ thereof is grounded. The selector 32 has an open fixed terminal $32_L$. The collectors of photo-transistors $12_{04}$ and $12_{05}$ are commonly connected, similar to other photo-transistors, and are then connected to the positive power supply terminal +B through the resistor 27 as well as to the port 1 of the microcomputer 21 through the buffer circuit 28.

While the movable terminal 29c of the selector 29 and the movable terminal 32c of the selector 32 are respectively connected to the open fixed terminals $29_L$ and $32_L$ by the control signal derived from port 2 of the microcomputer 21 through the data bus, the selector 22 sequentially selects and drives the light emitting diodes $11_{10}$, $11_{20}$, $11_{35}$, $11_{44}$ and $11_{53}$ and, in correspondence therewith, the selector 26 sequentially selects and drives the photo-transistors $12_{13}$, $12_{22}$, $12_{31}$, $12_{40}$ and $12_{50}$ to sequentially form the L beams. When an L beam is interrupted by a finger, an L coordinate is detected.

While the movable terminal 22c of the selector 22 and the movable terminal 26c of the selector 26 are respectively connected to the open fixed terminals $22_L$ and $26_L$ by the control signal from the port 2 of the microcomputer 21 through the data bus, the selector 29 sequentially selects and drives the light emitting diodes $11_{01}$, $11_{02}$, $11_{53}$, $11_{44}$ and $11_{35}$. In correspondence therewith, the selector 32 sequentially selects and drives the photo-transistors $12_{31}$, $12_{22}$, $12_{13}$, $12_{04}$ and $12_{05}$ to sequentially form the R beams. When an R beam is interrupted by a finger, an R coordinate is detected.

As described above, the light emitting diodes 11 are aligned on the bottom side of the display area and emit infra-red light beams in two directions. The photo-transistors 12 are aligned on the top side of the display area and receive the infra-red light beams in the two directions. The light emitting diodes 11 and the photo-transistors 12 are driven in a time-division-manner to form the L and R beams and they are driven in association with each other, in a parallel fashion. The aforementioned arrangement reduces the number of elements and decreases the cost, as compared to the case where respective elements are independently aligned in the directions of the beams so as to form and receive the beams.

As is clear from the schematic diagrams of FIGS. 5A and 5B, the photo-transistors 12 are all disposed facing the bottom side of the display screen so that they are not so sensitive to external light rays (sun light and/or a variety of illumination lights that are generally incident to the screen from the upper side). Therefore, even when the photo-transistors 12 are not directed to the corresponding light emitting diodes 11 in the direction (zero degree) to obtain the maximum light receiving directional pattern, a satisfactory optical S/N (signal-to-noise) ratio is achieved and the direction of the photo-transistors 12 does not cause any problem.

In this embodiment, the amount of light emitted by the light emitting element 11 is determined so that it is proportional to a square of the distance (beam length) between the corresponding elements. For example, current restricting resistors 41 and 42 are connected to the current paths of the light emitting diodes that form the beams on the corner portions: for example, the light emitting diodes $11_{10}$ and $11_{53}$ that form the right most and the left most L beams in FIGS. 5A and 5B. The current restricting resistors 43 and 44 are connected to the current paths of the light emitting diodes $11_{35}$ and $11_{01}$ that form the right most and left most R beams, respectively. These resistors 41 to 44 can be provided at any position of the current paths of the corresponding light emitting diodes $11_{01}$, $11_{53}$, $11_{35}$ and $11_{01}$, respectively. The resistance values of these resistors 41 to 44 are selected such that the currents of the light emitting diodes $11_{10}$, $11_{53}$, $11_{35}$ and $11_{01}$ will be smaller than those of the respective light emitting diodes that form light beams other than at the corner portions, thereby equalizing the intensity of the light beams incident on the light receiving elements.

Before describing the operation of the circuit shown in FIGS. 5A and 5B. The relationship between the finger and the light beam will be discussed with reference made to FIGS. 11A and 11B.

Figure 11A:
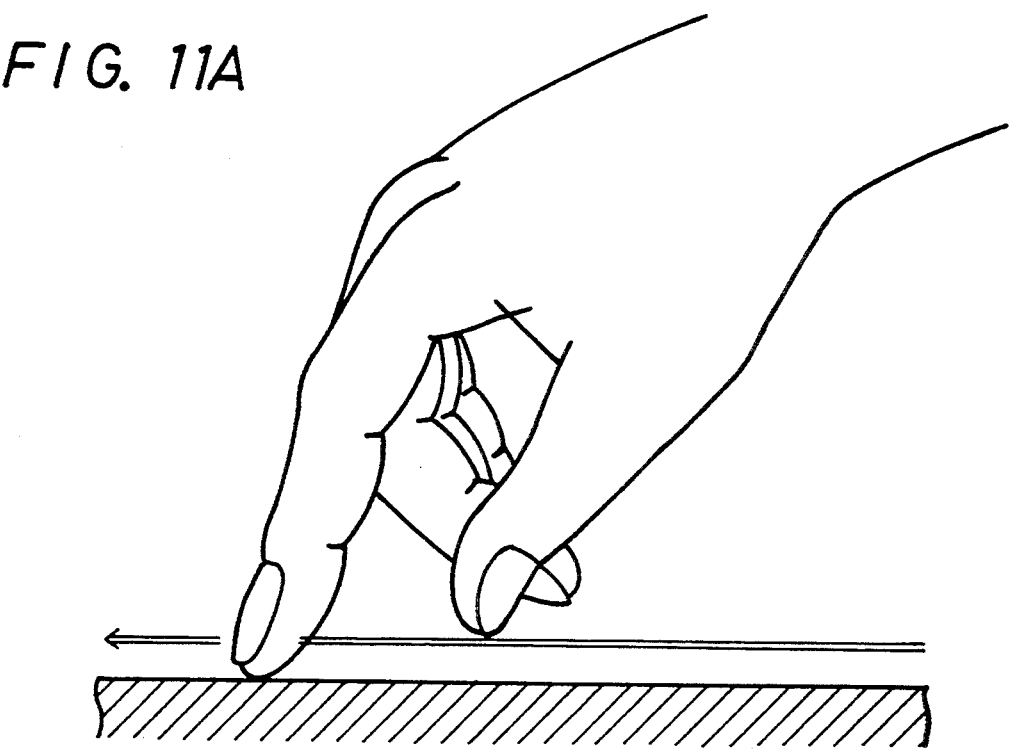
FIGS. 11A and 11B are schematic diagrams each showing a relationship between a hand and infra-red light beams.
Figure 11B:
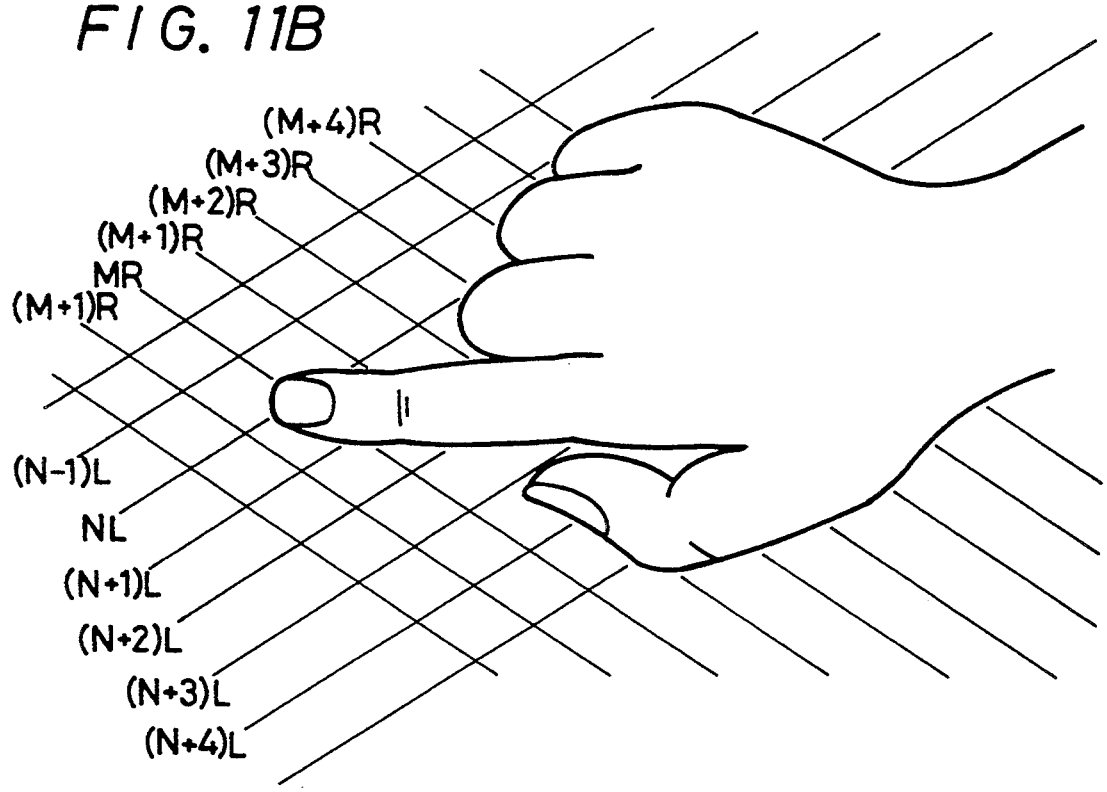

According to the touch panel apparatus attached to the video display screen, the operator situated in front of the video display screen operates the touch panel apparatus in an opposing relation to the picture on the video display screen. FIGS. 11A and 11B illustrate the relationship between the hand and the optical beams (infra-red light beams) of the touch panel apparatus, wherein FIG. 11A is a side view thereof and FIG. 11B is a top view thereof.

Generally, the operator touches an image (not shown), representing a command or the like displayed on the screen of a display apparatus, with his finger (forefinger). If his other fingers are not bent, as shown in FIG. 11A, the tips of his fingers (for example, the thumb and the middle finger in the case of FIG. 11A) interrupt the infra-red light beams.

In previous touch panel apparatus, where the sensing plane is formed by infra-red light beams orthogonally arranged relative to the rectangular-type video display screen, if the beams for detecting and determining a touched position in the vertical direction (V direction) are sequentially emitted from the top, (i.e., the light beams are scanned downward from the top), when the optical beam (infra-red light beam) is interrupted by the top of a forefinger extending from the bottom side of the video display screen, the touched position is determined by the first interrupted infra-red light beam. However, with respect to the infra-red light beams for detecting and determining a touched position in the horizontal direction (H direction), the beams may be interrupted by the thumb on the left side of the forefinger or the middle finger on the right side of the forefinger (the positional relation of the fingers is reversed if the operator touches the screen with the left hand) prior to the forefinger, depending on the scanning direction, (i.e., from left to right or from right to left), of the touch panel apparatus, whereby a different position is erroneously determined as the desired touched position, thus causing a malfunction.

To solve the above-mentioned problem, as shown in FIG. 11B, two optical beams (infra-red light beams) are obliquely aligned so as to become substantially symmetrical with respect to the direction in which the operator opposes, that is, in the vertical direction of the video display screen. Simultaneously, the right skewed beams (R beams) of the optical beams (infra-red light beams) are scanned from the upper left to the lower right, namely, in the sequential order of 1R, 2R, 3R, . . . (M−1)R, MR, . . . , while the left oblique beams (L beams) of the optical beams are scanned from the upper right to the lower left, namely, in the sequential order of 1L, 2L, 3L, . . . (N−1)L, NL, . . .

Accordingly, except for a case where the operator opens his hand, the optical beams are first interrupted by the top of the forefinger, and thus the specific coordinate values are obtained.

A specific coordinate value on the plane is obtained from the two specific coordinate values of the L and R beams so that data representing erroneous coordinate points can be prevented from being transmitted.

The following table, Table I, shows the relationships between the beam interruption conditions of the L and R beams.

TABLE I

| Beam Interruption | Determination |
|---|---|
| 0 | |
| 1 (One beam interrupted) | determination of coordinates |
| 2 (Two adjacent beams interrupted) | Determined at intermediate position |
| 3 to 4 (Adjacent beams interrupted) | Determined at intermediate position of first & second interrupted beams |
| 5 or more (Adjacent beams interrupted) | Determined as error |
| 1 + 1 (Beams interrupted, not interrupted, interrupted) | Ditto |
| 1 + 2 | Ditto |
| 1 + 3 | Ditto |
| 2 + 1 | Determined as error |
| 2 + 2 | Ditto |
| 2 + 3 | Ditto |
| 1 + 1 + 1 | Determined as error |
| and so on | |

("+" means a non-interrupted beam)

In Table I, Beam Interruption 1 represents that only one beam is interrupted, wherein the coordinates are determined from the position of the interrupted point. Beam Interruption 2 represents a case where two adjacent beams are interrupted, wherein coordinates are determined at the intermediate position of the two beams. Specifically, if the beams NL and (N+1)L, for example, are interrupted at the same time by the finger, the coordinate detection process is effected as if a virtual beam existed at the intermediate position between the two beams. If three to four beams are interrupted, the coordinates are determined at the intermediate position of the beams first and secondly interrupted beams. For example, if beams (N−1)L, NL, (N+1)L are sequentially interrupted in this order, the coordinates are determined at the intermediate position of the first interrupted beam (N−1)L and the second interrupted beam NL.

Other occasions than the above-mentioned interruptions, for example, five beams are sequentially interrupted, a first beam is interrupted and the next beam is not interrupted and then the following beam from the not interrupted beam is also interrupted or the like, are all treated as error.

As described above, the coordinates are determined only when one beam is interrupted or when a plurality of beams (up to four beams) are sequentially interrupted. In the latter case, the coordinates of the intermediate point of the first and secondly interrupted beams are determined as the coordinates.

The following Table II shows further relationships between interruption conditions of the L and R beams and the coordinate determination.

TABLE II

| Beam Interruption | Determination |
|---|---|
| 0 | |
| 1 (One beam interrupted) | Determination of coordinates |
| 2–4 (Adjacent beams interruption) | Mean values of coordinates of interrupted beams |
| 5 or more (Adjacent beams interrupted) | Mean values of coordinates of first four interrupted beams |
| 1 + 1 | Error |
| 1 + 2 | |
| 1 + 3 | |
| 4 + 1, 4 + 2, 4 + 3, 5 + 1, 5 + 2, 5 + 3, 5 + 4 | Mean values of coordinate of first four interrupted beams |
| Others, 4 + 4, 4 + 5, . . . 5 + 5, 5 + 6, . . . etc. | Error |

In Table II, when Beam Interruption 1 is detected, the coordinates are determined from the interrupted point, in the same manner as that in Table I. When it is detected that two to four beams are successively interrupted, the mean value of the coordinates of the interrupted beams are determined as the specified coordinates. When more than five beams are successively interrupted, the mean values of the coordinates of the first interrupted four beams are determined as the specified coordinates. When two to four beams are successively interrupted, mean values of the coordinates corresponding to the interrupted beams are determined as the specified coordinates. When five or more beams are successively interrupted, the mean values of the coordinates corresponding to the first four interrupted beams are determined as the specified coordinates. Hence, in the case of successively interrupting two to four beams, the mean values of the coordinates of the interrupted beams are always determined as the coordinates of the desired point, while in the case of successively interrupting five or more beams, the mean values of the coordinates of the first interrupted four beams are determined as the coordinates of the desired point. However, if it is detected that more than four beams are first interrupted sequentially and four or less beams discontinuous with the former four beams are next interrupted, the detection is considered to be effective, and the mean values of the coordinates of the four interrupted beams are determined as the desired coordinates.

If any other combination of interrupted beams is detected except for the above, for example, if a first beam is interrupted and the next beam is not interrupted while the following beam to the not interrupted beam is also interrupted or the like, it is treated as all error.

Incidentally, when two adjacent beams, for example, beams NL and (N+1)L are interrupted by the finger, the coordinates are determined on the assumption that a virtual beam exists on the intermediate line of the two interrupted beams. Therefore, the touch panel apparatus according to the present embodiment has the resolution of ½ the interval of the aligned beams. For such possible operation, if it is detected that a beam (NL in the above-mentioned example) is interrupted, at least the adjacent beam ((N+1)L) should be examined whether it is interrupted or not. It should be appreciated that the present embodiment ensures to determine the coordinates of a point specified by a finger on the basis of the beam which is first interrupted.

If the scanning direction of the beams is reversed, the positions of the interrupted beams are stored in a memory of a microcomputer, as will be later referred to, and the coordinates are determined on the basis of the position of the last interrupted beam.

In the above-mentioned embodiment, the leftwardly skewed beams and the rightwardly skewed beams sequentially scan so as to determine the coordinates of a position specified by a finger on the basis of the first or last interrupted beam. It is apparent that the present invention aims at determining the coordinates of a position specified by a finger on the basis of the uppermost position of the interrupted beams in the leftwardly and rightwardly skewed beams.

To render the features of the present invention clearly understandable, the operation of the touch panel apparatus according to the present invention will be again explained with reference to the flow charts in FIGS. 6 and 7 which depict the programming followed by the microcomputer 21 in carrying out the above-described operations. The flow chart of FIG. 6 explains the operation that the next scanning is stopped after one beam is interrupted, whereas the flow chart of FIG. 7 is used to explain the operation that even after one beam is interrupted, the succeeding scanning is effected to carry out the scanning for all beams.

Figure 6:
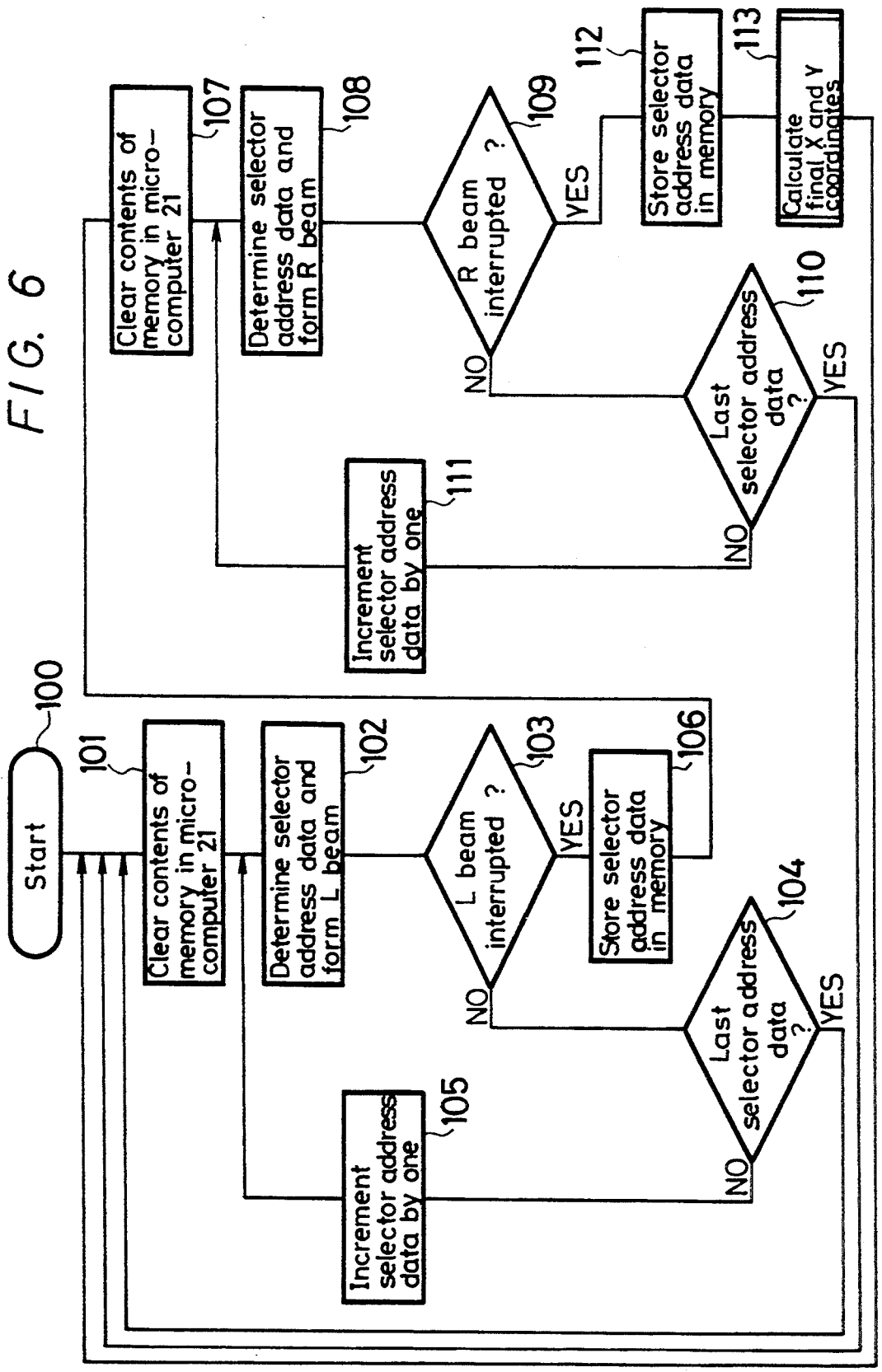
FIGS. 6 and 7 are flow charts explaining the operation of the touch panel apparatus of the invention shown in FIG. 5A and 5B.
Figure 7:
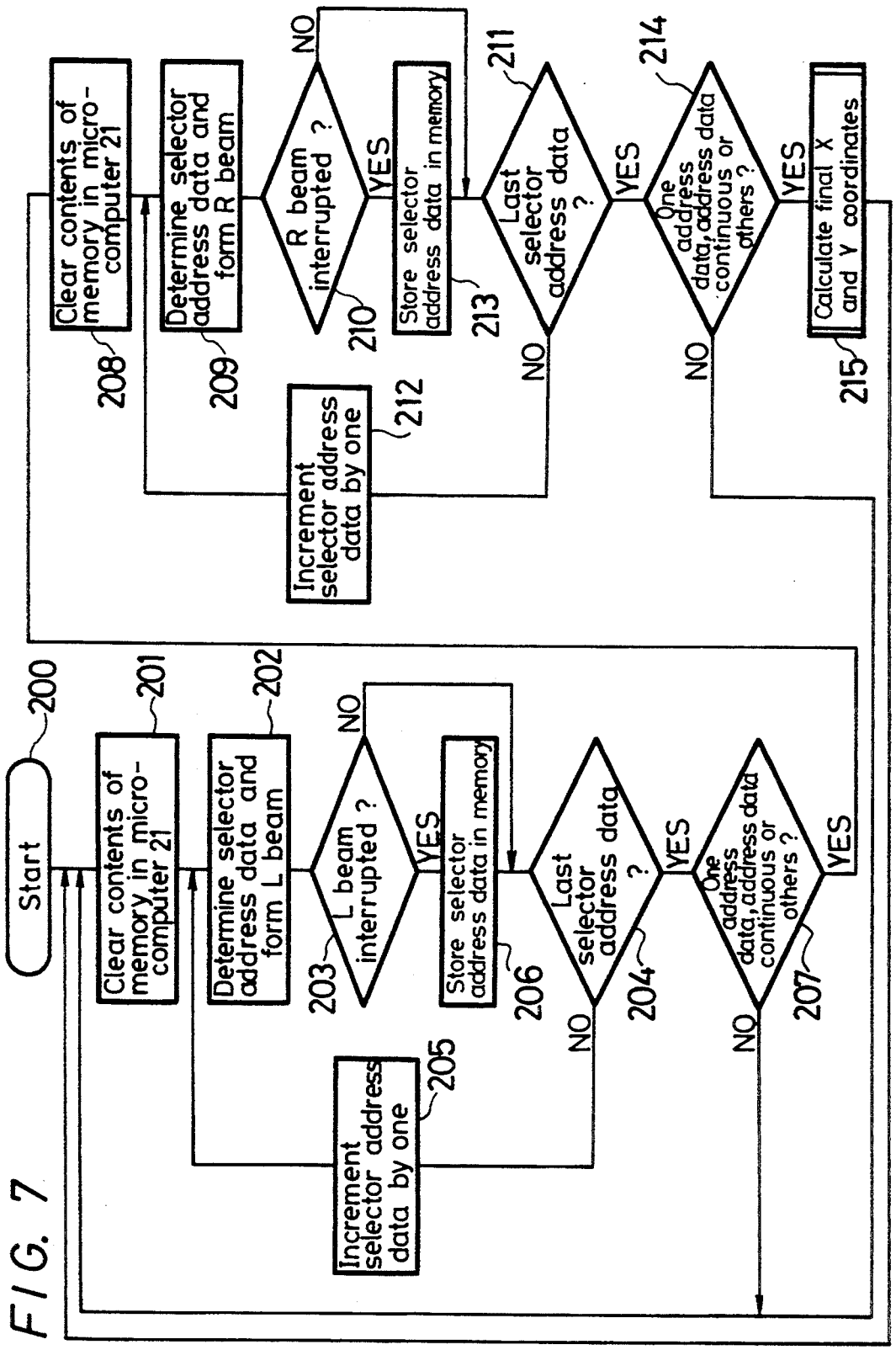

Referring initially to FIG. 6, the routine begins with step 100, and the routine proceeds to step 101, where the content of the memory (not shown) in the microcomputer 21, which stores the data when the L beam is interrupted during the time that the selectors 22 and 26 are selected, is cleared. Then, at step 102, address data is supplied from the microcomputer 21 to the selectors 22 and 26, to actuate the light emitting diodes 11 and the corresponding photo-transistors 12 to form L beams.

At decision step 103 it is determined whether the current L beam is interrupted by a finger or the like. If it is not, the routine proceeds to the next decisional step 104, where it is determined whether the current address data to be supplied to the selectors 22 and 26, which select the light emitting diodes 11 and the photo-transistors 12 for forming L beams, is the last data. If it is not, the routine proceeds to step 105, where the current address data for the selectors 22 and 26 are incremented by one; the routine then returns to step 102; and the above-mentioned steps are repeated to effectively scan the screen s with a sequence of L beams.

If it is determined at step 104 that the current address data to be supplied to the selectors 22 and 26 is the last data, indicating that none of the L beams are interrupted, as represented by a YES at decision step 104, the routine returns to step 101, and the above-mentioned steps are repeated.

If it is determined that an L beam is interrupted, as represented by a YES at step 103, the routine proceeds to step 106, where the corresponding current address data given to the selectors 22 and 26 is stored in the memory of the microcomputer 21 as the designated L coordinate. The thus detected address data represents the position at which the L beam is first interrupted.

Then, the routine proceeds to step 107, in which the content of the microcomputer 21 memory, which stores the data when the R beam is interrupted during the time that the selectors 29 and 32 are selected, is cleared. Then, at step 108, the microcomputer 21 supplies the current address data to the selectors 29 and 32, which sequentially actuate the light emitting diodes 11 and the corresponding photo-transistors 12 to form the R beams.

Then, at the next decisional step 109 it is determined whether the currently selected R beam is interrupted. If it is not interrupted then, at the next decisional step 110, it is determined whether the last address data was supplied to the selectors 29 and 32 which select the light emitting diodes 11 and the photo-transistors 12 forming the R beams. If it is determined that the last address data was not supplied to the selectors 29 and 32, as represented by a NO at step 110, the routine proceeds to step 111, where the current address data supplied to the selectors 29 and 32 is incremented by one.

The routine then returns to step 109, and the above-mentioned steps are repeated. If it is determined that the last address data was supplied to the selectors 29 and 32, i.e. that the R beams have not been interrupted at all, as represented by a YES at step 110, the routine again returns to step 101, and the aforenoted steps are repeated.

At step 109, if it is determined that the R beam is interrupted, the routine proceeds to step 112. The current address data which was supplied to selectors 29 and 32, which selected the light emitting diodes 11 and the photo-transistors 12 forming the interrupted R beam, is stored. The stored data corresponds to the R coordinates: the position at which the R beam is first interrupted.

Then, at step 113, the respective address data stored in the memory of the microcomputer 21 corresponding to the interrupted L and R beams is read, and the final X and Y coordinates are calculated.

More specifically, the R and L coordinates detected by the microcomputer 21 are converted into orthogonal (X, Y) coordinates. For example, assuming that the coordinate values detected, as described herein-above, are preliminary coordinate values (oblique coordinate values MR, NL), the orthogonal coordinate values (X, Y) which correspond to the preliminary coordinate values are prepared in the microcomputer 21 memory (ROM) by converting (MR, NL) into (X, Y) coordinates.

The operation of the second embodiment of the present invention is hereinafter described with reference to the flow chart of FIG. 7.

Referring to FIG. 7, the routine begins with step 200, and the routine proceeds to step 201, where the contents of the microcomputer 21 memory where the last condition when the L beam was interrupted when the selectors 22 and 26 are selected, is cleared. At step 202, the microcomputer 21 supplies the current address data to the selectors 22 and 26, which actuate the corresponding light emitting diodes 11 and the photo-transistors 12 to form L beams.

At the next decision step 203, it is determined whether the L beam is interrupted by a finger or the like. If it is not, the next decision step 204 determines whether the current address data supplied to the selectors 22 and 26 which select the light emitting diodes 11 and the photo-transistors 12 that form L beams, is the last data. If it is determined that the current address data is not the last data, as represented by a NO at step 204, the routine proceeds to step 205, where the current address data for the selectors 22 and 26 is incremented by one. Then, the routine returns to step 202, and the above-mentioned steps are repeated.

If it is determined that the L beam is interrupted, as represented by a YES at step 203, then the routine proceeds to step 206, where the microcomputer 21 memory stores the current address data supplied to the selectors 22 and 26. The routine then proceeds to step 204, and the afore-noted steps are executed repeatedly.

If it is determined that the last address data is supplied to the selectors 22 and 26, as represented at step 204, or if all the scannings of L beams have ended, regardless of whether all of the L beams are interrupted or not, the routine proceeds to step 207. In step 207 it is detected whether the address data detected in accordance with the beam interruption is single, sequential or other than that as discussed previously in reference to Tables I and II. If the detected address data does not evidence these acceptable patterns, then the routine returns to step 201, and the above-mentioned steps are repeated. If so, the routine proceeds to step 208.

In step 208, the content of the microcomputer 21 memory which stores the last condition when the R beam was interrupted when the selectors 29 and 32 are selected, is cleared. Then, the routine proceeds to step 209, where the microcomputer 21 supplies the current address data to the selectors 29 and 32, which actuate the light emitting diodes 11 and the corresponding photo-transistors 12 to form the R beams.

At the next decision step 210 it is determined whether the R beam is interrupted by the finger and the like. If NO is output at step 210, the routine moves to the next decision step 211, where it is determined whether the last address data is fed to the selectors 29 and 32, which select the light emitting diodes 11 and the photo-transistors 12 that form R beams. If NO is output at step 211, the routine proceeds to step 212, where the current address data for the selectors 29 and 32 is incremented by one. Then, the routine returns to step 209, and the above-mentioned steps are repeated.

If it is determined that the R beam is interrupted, as represented by a YES at step 210, the routine proceeds to step 213, where the corresponding address data fed to the selectors 22 and 26, which selected the light emitting diodes 11 and the photo-transistors 12 that form the interrupted R beam is stored in the memory of the microcomputer 21 as the R coordinate information. Then, the routine proceeds to step 211, and the above-mentioned steps are repeated.

At step 211, if it is determined that the last address data is supplied to the selectors 29 and 32, or that the scanning of all at the R beams is completed, regardless of whether or not all of the R beams are interrupted, the routine proceeds to the next decision step 214. In step 214, it is determined whether the address data detected in accordance with the interruption of the beam is one, continuous or other than that. If not, the routine returns to step 201, and the above-mentioned steps are repeated. If so, the routine proceeds to step 215.

In step 215, the respective address data stored in the microcomputer 21 memory is read in order to calculate L and R coordinates. If one address data is detected, then the L and R coordinate values are determined by duplicating the address data. If a plurality of address data are detected, then the L and R coordinate values are determined on the basis of the added value of the first and second data.

Then, the L and R coordinate values determined by the microcomputer 21 are converted into orthogonal coordinate values. For example, if the coordinate values detected, as described above, are preliminary coordinate values (oblique coordinate values), for example, MR, NL, then the coordinate values (X, Y) of the objective coordinate (orthogonal coordinate) corresponding to the preliminary coordinate values (MR, NL) can be looked up in a look-up table of values previously stored in the microcomputer 21 ROM. Therefore, the true, desired coordinate values (X, Y) can be obtained by converting (MR,NL) into (X,Y) by performing the following conversion under the relationship:

(NL, MR) → (X, Y)

In accordance with the embodiment of the present invention, as set forth above, since the resistance values of the current-restricting resistors 41 to 44 provided in the current paths of the light emitting diodes 11 that form the infra-red light beams at the corner portions of the screen, are selected to reduce the current flowing thereto, as compared with the current flowing into the light emitting elements that form infra-red light beams in other portions, so that the intensity of the light beams incident on all of the photo-transistors are made equal, the operation of the circuit arrangement shown in FIG. 5 becomes substantially the same as that of the circuit shown in FIG. 2. Thus, the buffer circuit 28 does not produce an erroneous pulse signal in response to the reflected light, thereby preventing the touch panel apparatus from malfunctioning.

While in the above-mentioned embodiment there are typically shown five L beams and five R beams, the number of L and R beams is not limited; it can be freely varied, if necessary. The number of the light emitting diodes 11, the number of the photo-transistors 12, and the number of the fixed terminals of the selectors 22, 26, 29 and 32 can be freely varied also.

As is clear from FIGS. 3A to 3C and FIGS. 4A to 4C and the explanation made so far in connection with the figures, the signal form output by the photo-transistors 12 is regarded as an important factor.

Figure 12A:
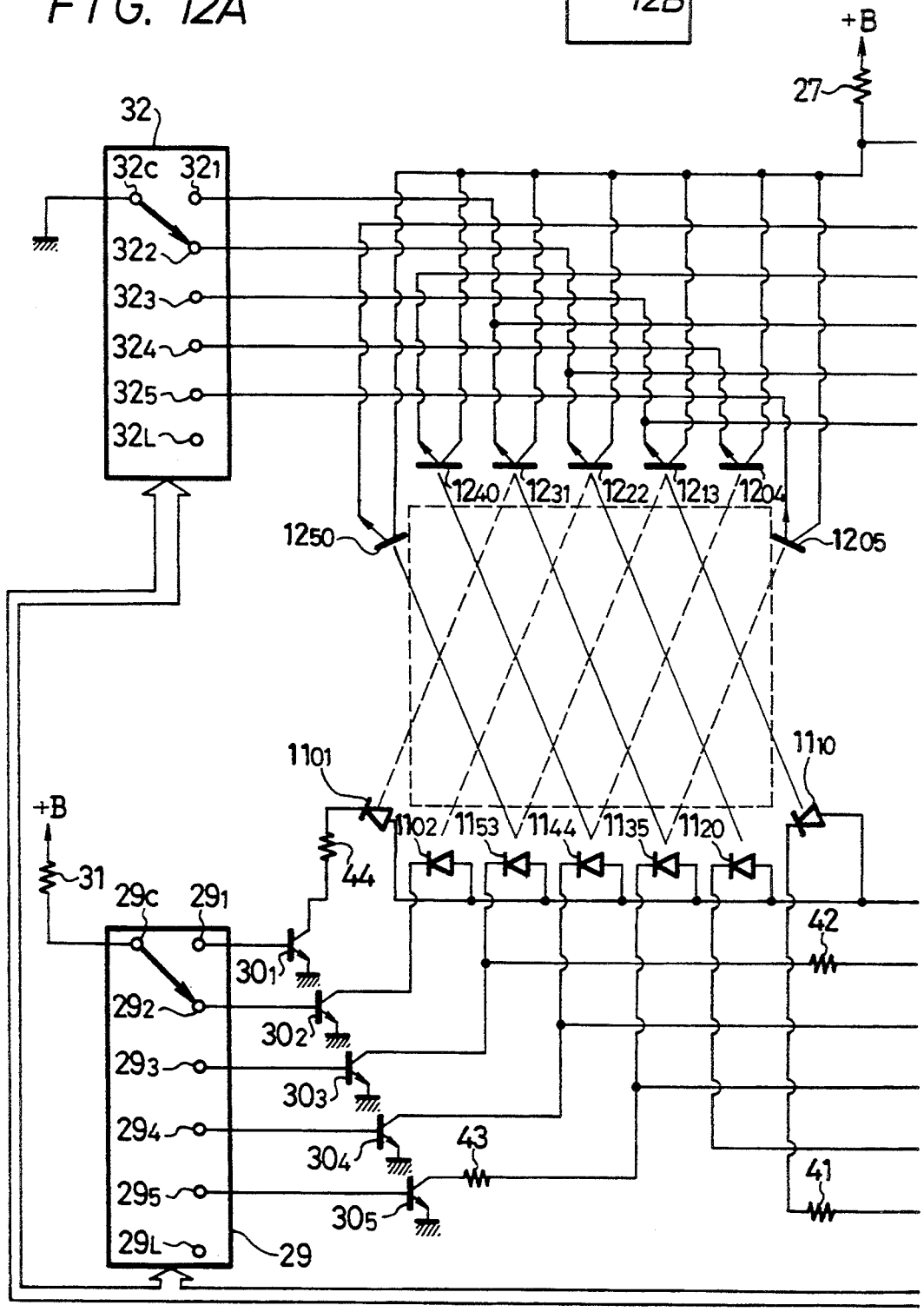
FIGS. 12A and 12B together form a block diagram showing a circuit arrangement of the present invention.
Figure 12B:
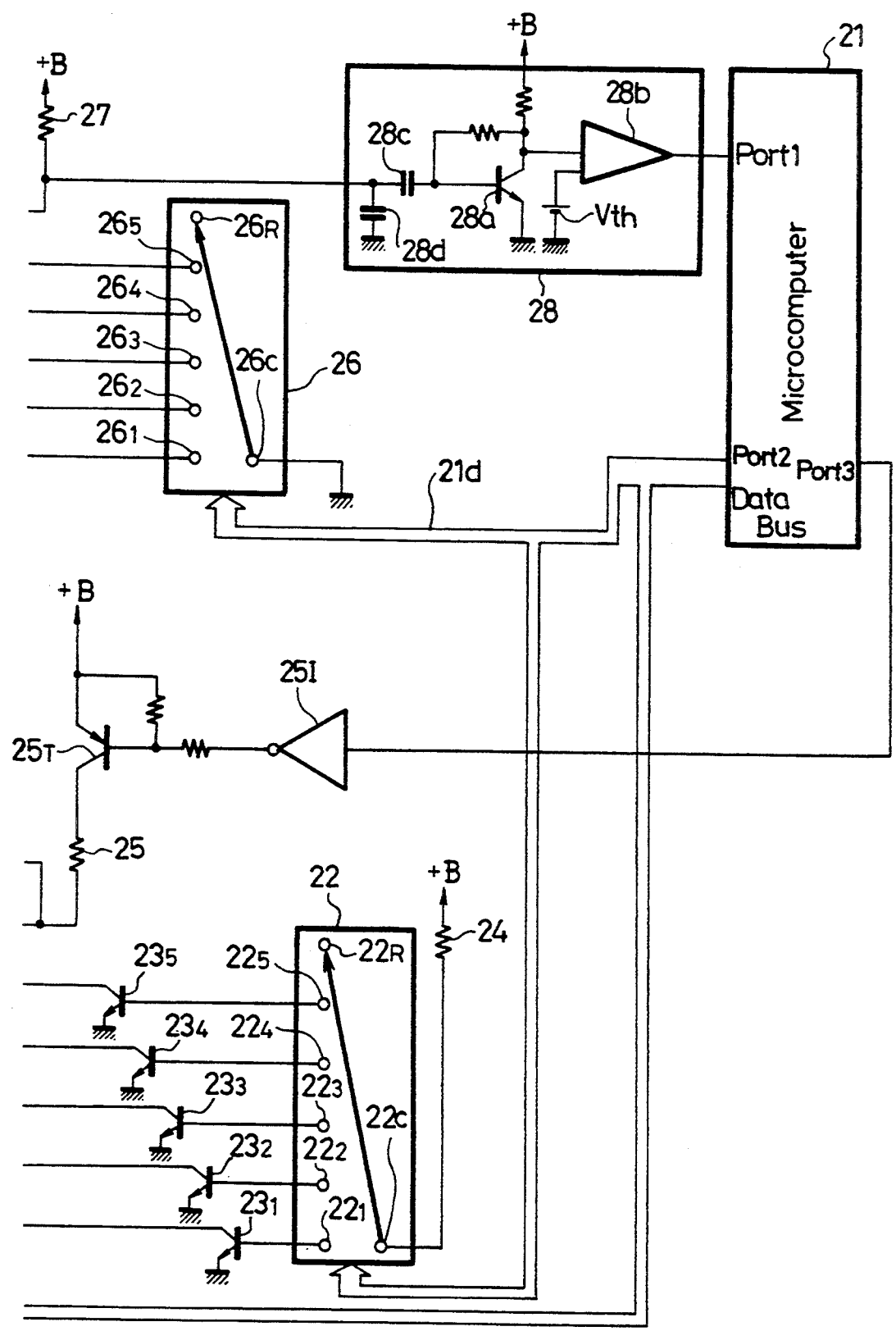

FIGS. 12A and 12B are similar to FIGS. 5A and 5B, and together form a block diagram illustrating another one of the circuit arrangements of the present invention. FIGS. 13A to 13E are waveform diagrams of the signals relating to the buffer circuit 28. In FIGS. 12A and 12B, like parts corresponding to those of FIGS. 5A and 5B are marked with the same reference numerals and therefore are not be described in detail.

Referring to FIGS. 12A and 12B, a current switch transistor 25T is operatively connected in series with the current-restricting resistor 25. The current switch transistor 25T receives a signal which results from inverting an output signal (diode drive output) derived from port 3 of the microcomputer 21 by an invertor 25I. The signal drives the light emitting diodes 11 and the switching transistors $23_1$–$23_5$ and $30_1$–$30_5$ in an AND-fashion, as will be clear from the foregoing description. In FIGS. 12A and 12B, other elements are not described for the sake of simplicity.

The thus arranged touch panel apparatus is operated as follows. Referring also to FIG. 13E, the selectors 22 and 26 (32 and 29), driven by the address signal from port 2 of the microcomputer 21, synchronously turn the light emitting diodes 11 and the photo-transistors 12 ON. Here, needless to say, it is the opposing elements that are selectively turned ON.

However, there is another consideration. For example, even while the photo-transistor $12_{13}$ is turned OFF, it still receives infra-red light beams emitted from light emitting diodes that are turned ON during the period in which the photo-transistor $12_{13}$ is not turned ON or during the period in which the light emitting diodes $11_{10}$ or $11_{53}$ opposing the photo-transistor $12_{13}$ are not turned ON, and also receives external light so that in the base of the photo-transistor $12_{13}$ there is an accumulated charge (carrier) optically energized thereby. When the photo-transistor $12_{13}$ is turned ON, this accumulated carrier flows through the photo-transistor $12_{13}$ momentarily, whereby a current flows into the load resistor 27 that is common to the photo-transistors 12, thus producing a false output signal as illustrated in FIG. 13A.

This false output signal 34 is very large, as shown in FIG. 13A, so that if the signal from the light emitting diode is superimposed upon the false output signal, it becomes very difficult to determine whether the light emitting diode $11_{10}$ or $11_{53}$ actually emitted the light beam.

Although the photo-transistors 12 and the light emitting diodes 11 are synchronously turned ON by the selector 22 or 29 which select the light emitting diodes 11 in synchronism with the selector 26 or 32, in practice, no current flows in the light emitting diodes 11.

The false output signal 34, based on the output of the common load resistor 27 to the photo-transistors 12, (i.e., the accumulated carrier) is rapidly attenuated as shown in FIG. 13A. After the false output signal is attenuated, the current switch transistor 25T is turned ON as shown in FIG. 13D, so that a current begins to flow into the selected diode $11_{10}$ (or $11_{53}$).

The photo-transistor $12_{13}$ receives the infra-red ray emitted from the light emitting diode $11_{10}$ (or $11_{53}$) and then generates an output signal as a correct photo-detected signal as described above. The false signal and the correct photo-detected signal are connected by a coupling capacitor 28c of the buffer circuit 28 to its succeeding amplifying transistor 28a and the signals are amplified, thereby producing a signal as shown in FIG. 13B.

It is apparent that in the signal level of the amplified signals shown in FIG. 13B, the steady state component of the output level due to external light (for example, sun light) received by the photo-transistors 12 is removed by the coupling capacitor 28c, so that only the alternate current component thereof is transmitted.

Also, by using the filter capacitor 28d, connected between the input to the amplifier circuit 28 and the circuit ground, and the common load resistor 27 of the photo-transistors 12, as well as a certain filter characteristic, a high frequency photo-fluctuated component (e.g. a disturbance derived from a fluorescent light lamp which is operated at high frequency) is removed.

The output therefrom is supplied to a level comparator 28b, and then the level comparator 28b generates a pulse signal P2 as shown in FIG. 13C. Similarly, as described above, the second pulse signal P2 corresponding to the photo-detected signal is used to determine whether the infra-red light beam is interrupted.

Though not shown in the illustration, the detected coordinate is supplied to the computer system as a serial signal of, for example, an RS232C-type, by means of a microcomputer (or by means of a signal processing system) similar to the conventional system.

Figure 14:
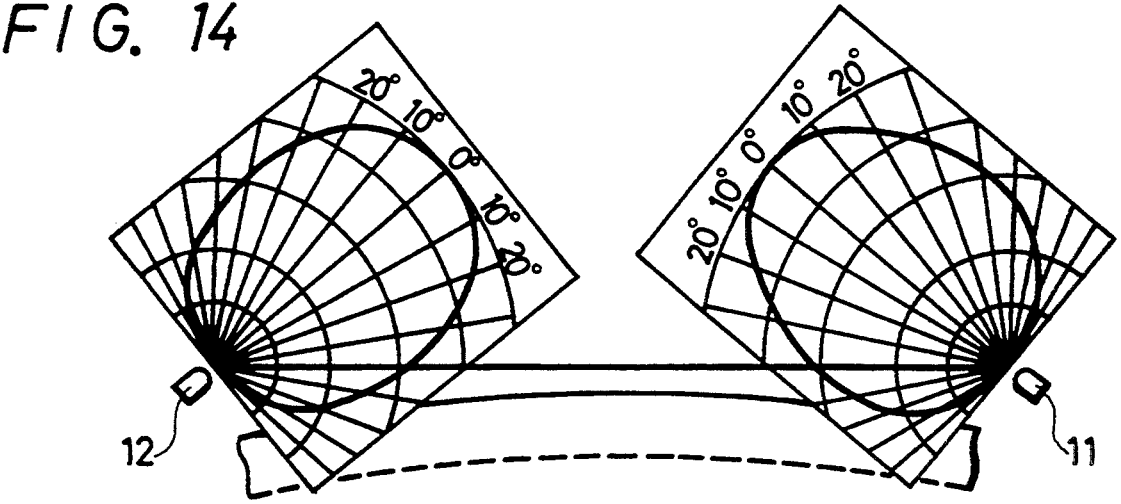
FIG. 14 is a schematic diagram showing another embodiment of the present invention.

While in the above-mentioned embodiment a current restricting resistor is employed to equalized the light intensities reaching the photo-detectors 12, the variation shown in FIG. 14 is possible where the maximal length (alignment axis) of the corresponding light emitting diode 11 and/or photo-transistor 12 at the corner portion of the display screen is displaced from the optical axis that connects the opposing elements. In this case, the maximal length is preferably displaced toward the upper direction relative to the display apparatus located at the bottom of the touch panel apparatus.

Alternatively, the outputs from the photo-transistors which were provided as the light receiving elements for forming the beams at the corner portions can be selectively supplied to an amplifier having a low amplification factor. In this case, the selection (switching) of the outputs can be made corresponding to the address data input to the selector.

As mentioned above, according to the present invention, it is possible to avoid malfunctioning caused when a light beam in a corner portion of the screen is interrupted by a finger and, because of the relative close proximity of the light source to the finger and the consequent greater intensity of the light beam, reflected light beams are caused. This is accomplished according to the present invention by making the sensitivity of the light receiving elements of the corner located photo-detecting pairs substantially equal to the photo-detecting pairs located at other parts of the screen where the beam lengths are longer.

The amount of reflected light, from the undesired corner beam which previously caused the touch panel apparatus to malfunction, is as if the infra-red light beam was not interrupted.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch panel apparatus, comprising:
 a display having a display surface with a substantially rectangular display area;
 a plurality of photo-detecting means for generating a first set of a plurality of parallel detecting beams of different lengths passing across the display surface and a second set of a plurality of parallel detecting beams of different lengths passing across the display surface, wherein the detecting beams of the first set are skewed relative to the rectangular display area and to the detecting beams of the second set;
 means for reducing the sensitivity of those of the photo-detecting means which have a relatively shorter beam length; and
 a process circuit connected to the photo-detecting means for detecting the interrupted beams.

2. The touch panel apparatus of claim 1, wherein:
 each of the photo-detecting means has a beam emitting device having a beam emitting power associated therewith; and
 the means for reducing the sensitivity reduces the beam emitting power of the beam emitting devices having a relatively shorter beam length.

3. The touch panel apparatus of claim 1 wherein the display surface is substantially planar.

4. A touch panel apparatus, comprising:
 a display having a display surface with a substantially rectangular display area;
 a plurality of photo-detecting means for generating a first set of a plurality of parallel detecting beams of different lengths passing across the display surface and a second set of a plurality of parallel detecting beams of different lengths passing across the display surface, wherein the detecting beams of the first set are skewed relative to the rectangular display area and to the detecting beams of the second set, each of the photo-detecting means has a beam emitting device having a beam emitting power associated therewith and a separate beam receiving device in a photo coupled alignment with the beam emitting device;

means for reducing the sensitivity of those of the photo-detecting means which have a relatively shorter beam length by adjusting the photo coupling alignment between the beam emitting device and the beam receiving device; and a process circuit connected to the photo-detecting means for detecting the interrupted beams.

5. A touch panel apparatus comprising:

a display having a curved display surface;

a first set of a plurality of photo-detecting means for generating a plurality of first parallel beams of differing lengths for passing across the display surface, the first set of photo-detecting means being provided at the periphery of the display surface;

a second set of a plurality of photo-detecting means for generating a plurality of second parallel beams of differing lengths for passing across the display surface, the second set of photo-detecting means being provided at the periphery of the display surface;

the first and second plurality of beams being skewed relative to the curve of the display surface;

means for reducing the sensitivity of the photo-detecting means which generate beams having a relatively shorter beamlength in comparison to the other beams generated by the first and second sets of photo-detecting means; and a process circuit connected to the first and second sets of photo-detecting means for detecting interrupted beams and determining the location of the interrupted beams.

6. The touch panel apparatus of claim 5, wherein the first beams have positive angles relative to the direction of curvature of the display surface, and the second beams have negative angles relative to the direction of curvature of the display surface.

7. The touch panel apparatus of claim 5, wherein the means for reducing the sensitivity of the photo-detecting means which generate beams having a relatively shorter beam length further comprises means for filtering out steady state signals and high frequency, transient signals.

8. A touch panel apparatus, comprising:

a display having a display surface with a substantially rectangular display area;

a plurality of photo-detecting means for generating a plurality of detecting beams of different lengths passing across the display surface, wherein the detecting beams are skewed relative to the rectangular display area, each of the photo-detecting means has a beam emitting device having a beam emitting power associated therewith, each of the photo-detecting means has a separate beam receiving device in a photo coupled alignment with it;

means for reducing the sensitivity of those of the photo-detecting means which have a relatively shorter beam length by adjusting the photo coupling alignment between the beam emitting device and the beam receiving device; and a process circuit connected to the photo detecting means for detecting the interrupted beams.

* * * * *